(12) United States Patent
Powell

(10) Patent No.: US 6,701,159 B1
(45) Date of Patent: Mar. 2, 2004

(54) JACKET FOR CELLULAR PHONE

(76) Inventor: Andew P. Powell, 29 Hall Ave., Somerville, MA (US) 02144

( * ) Notice: Subject to any disclaimer, the term of this patent is extended or adjusted under 35 U.S.C. 154(b) by 0 days.

(21) Appl. No.: 09/517,931

(22) Filed: Mar. 3, 2000

(51) Int. Cl.[7] .............................................. H04M 1/00
(52) U.S. Cl. .................... 455/550; 455/90; 455/575; 455/128; 379/446
(58) Field of Search ............................. 455/90, 575, 550; 379/446, 455; 248/176.1, 316.7, 316.1, 313, 309.1; 224/929, 930, 664, 253, 240, 242, 290, 245–246; D3/128

(56) References Cited

U.S. PATENT DOCUMENTS

| | | | | |
|---|---|---|---|---|
| 4,775,083 A | * | 10/1988 | Burger et al. | 224/240 |
| 4,858,798 A | * | 8/1989 | Siddoway et al. | 224/240 |
| 4,901,852 A | * | 2/1990 | King | 206/320 |
| 5,025,921 A | * | 6/1991 | Gasparaitis et al. | 150/165 |
| D360,654 S | * | 7/1995 | Castilloux | D20/42 |
| 5,762,304 A | * | 6/1998 | Hyatt | 248/176.1 |
| 6,082,535 A | * | 7/2000 | Mitchell | 150/154 |
| 6,130,945 A | * | 10/2000 | Shin | 379/455 |
| 6,341,217 B1 | * | 1/2002 | Wong | 379/446 |

* cited by examiner

Primary Examiner—Pablo N. Tran

(57) ABSTRACT

The invention includes a protective enclosure for a rectilinearly-shaped cellular telephone having an external antennae to improve the securement of that cellular telephone by a user thereof. The protective enclosure comprises an enclosure web portion covering the front, sides, top and bottom portions of the cellular telephone. An opening is arranged through at least one of the enclosure web portions to permit exposure of certain components of the cellular telephone, and a bulbous corner pad is arranged on the lower corner portions of the cellular telephone to protect it if it is dropped and aid in holding the phone.

2 Claims, 2 Drawing Sheets

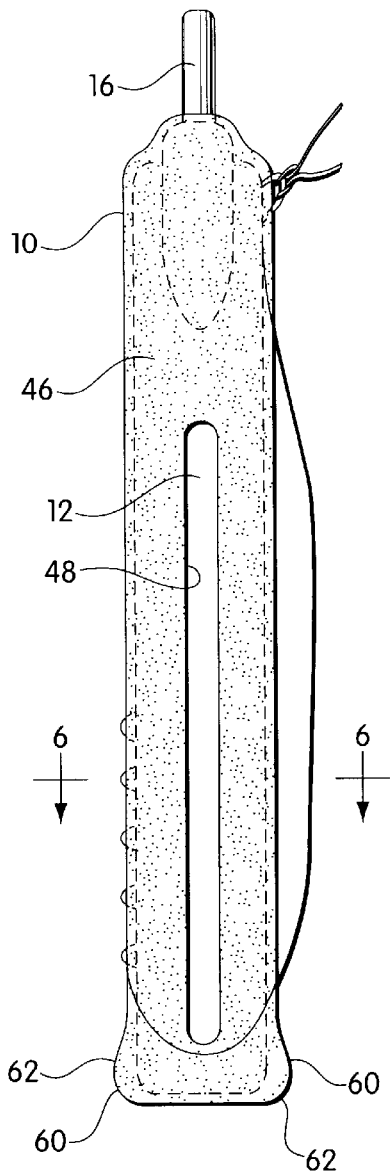
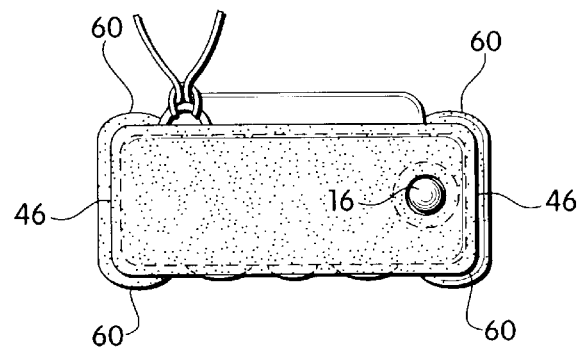
Fig. 4
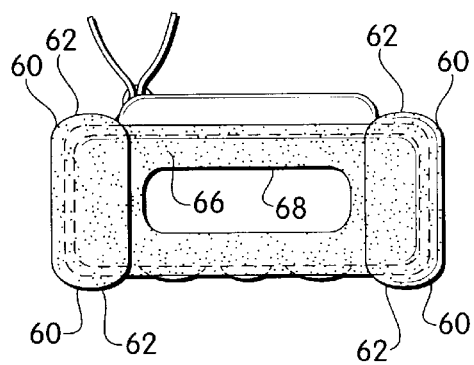
Fig. 5
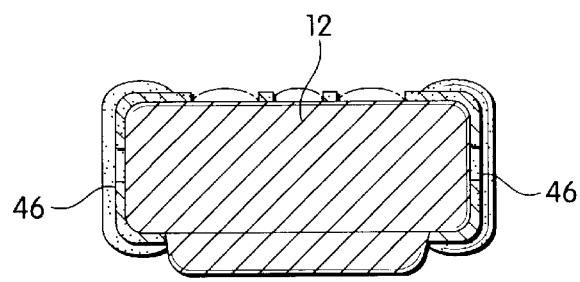
Fig. 6
Fig. 3

JACKET FOR CELLULAR PHONE

BACKGROUND OF THE INVENTION

1. Field of the Invention

This invention relates to carrying devices for cellular telephones, and more particularly to a resilient protective carrier for a cellular phone.

2. Prior Art

The past ten years have seen an exponential increase in the use of cellular phones. Their construction has evolved from brick-like assemblies to pocket sized electronic packages. These pocket sized electronic packages are in many instances expensive, and in all instances, fragile.

An early carrier or mount for such communication devices is shown in U.S. Pat. No. 4,299,344 to Yamashita et al. showing a rigid frame having side and back plates acting as a carrying mount arrangement. U.S. Pat. No. 4,325,142 to Nakazawa shows a portable telephone with a carrying holder which may receive the telephone in either of two facing directions. U.S. Pat. No. 5,253,292 to Fluder et al. shows a cellular telephone carrier assembly which pen-nits pivotable articulation of a cellular telephone within the carrier. U.S. Pat. No. 5,383,091 to Snell shows a grip and protective casing for a cellular telephone which covers the rear and a part of the side edges of that cellular telephone. U.S. Pat. No. 5,818,924 to King et al. shows a communication keypad with a protective cover of rigid material and a hinged front door over that keypad.

It is an object of the present invention to provide a protective assembly for a cellular telephone which is an improvement over the prior art arrangements.

It is a further object of the present invention, to provide a protective cover for a cellular telephone, which will safely protect all sides of that cellular device.

It is still yet a further object of the present invention, to provide a protective cover for a cellular telephone which is comfortable and easy to utilize.

It is still yet a further object of the present invention, to provide a protective enclosure for a cellular telephone which will accommodate a variety of cellular telephone sizes.

BRIEF SUMMARY OF THE INVENTION

The present invention comprises a protective enclosure for cellular telephones. The typical cellular telephone is of rectilinear configuration sized to readily fit in a person's hand or a pocket. The typical cellular telephone has an upper end with an antennae extending upwardly from an upper surface thereof on one side, a front facing panel having a speaker on an upper end thereof, a power button, a monitor panel and a pressable keypad for exposing alphanumeric keys, and a lower microphone adjacent its lowermost edge.

The protective enclosure in a preferred embodiment, comprises a web of elastomeric rubber, about ⅛ of an inch thick, molded to fit about the peripheral contours of a typical rectilinearly-shaped cellular telephone. The elastomeric rubber will stretch so as to accommodate slight size range of most typical present day cellular telephones. The protective enclosure of the present invention comprises an elastomeric web of material covering all sides the cellular telephone, having an opening for a power button adjacent an uppermost edge of the cellular telephone, a generally oval shaped opening on the upper front panel, to accommodate a speaker on that cellular telephone, and an elongated rectangular opening to permit viewing of the monitor and access to the keypad of that cellular telephone. A lowermost opening for the microphone is disposed immediately adjacent and beneath the rectangular opening in the front panel of the protective enclosure. An elastomeric bridging strap is disposed between the opening for the speaker and the rectangular opening for the monitor and keypad, so as to provide strength and maintenance of the enclosure panel on the front side of the cellular telephone. A similar bridging strap comprises the lower portion of the front panel, between the microphone opening and the rectangular opening for the keypad.

The protective enclosure includes side panels to cover the sides of the cellular telephone. An elongated side opening extends from a lowermost portion to an uppermost portion of each side panel, approximately three fourths of the length of that side panel. The protective enclosure has an uppermost panel covering the entire uppermost surface of the cellular telephone, except for the opening permitting the antennae of that cellular telephone to extend therethrough.

The protective enclosure has a generally rectangular opening on its rear side, to accommodate any enlarged portion of the cellular telephone, for example a battery component thereon, or to permit access thereto.

The protective enclosure has four lowermost corners, which are provided with a bulbous corner pad protruding thereon. Each bulbous corner pad on the four lowermost corners of the protective enclosure comprise further safety arrangements for the cellular telephone enclosed within the protective enclosure.

The protective enclosure has a lowermost panel with an elongated opening thereacross extending between the bulbous corner numbers. The lowermost opening permits access to any power sockets which the typical cellular telephone may utilize.

The elastomeric material, which is critical to applicant's invention, will typically yield to accommodate slight variations in cellular telephone dimensions. Silicone rubber to be used in this invention. The elastomeric rubber material also provides the surface texture and the structure necessary for ideal for securely holding such a cellular telephone. The elongated side openings and the elongated opening in the lowermost panel of the protective enclosure also permits improved holding power, and accommodation for the possible size variations between different cellular telephones.

In a further embodiment of the present invention, a support loop is secured to the uppermost corner of the protective enclosure on the side opposite the antennae opening, which loop permits a safety strap to be threaded therethrough for further securement or loss prevention of the cellular telephone therewithin.

The invention thus comprises a protective enclosure for a rectilinearly-shaped cellular telephone having an external antennae, to improve the securement of that cellular telephone by a user thereof, said protective enclosure comprising: an enclosure web portion covering the front, sides, top and bottom portions of the cellular telephone; an opening through at least one of the enclosure web portions to permit exposure of certain components of the cellular telephone; and bulbous corner pads which can be up to ¼" thick on the lower portions of the cellular telephone. The protective enclosure portions are comprised of an elastomeric rubber least ¹⁄₁₆" (min. wall) of an inch thick. The opening in the web portions of elastomeric rubber material is arranged through each of the panels thereof. An opening of the web of elastomeric material is arranged in the rearmost portion thereof. The enclosure may include a loop through the elastomeric material on an upper end of the enclosure, to permit a securement strap to be arranged thereto.

Thus what has been shown is a unique protective enclosure for a cellular telephone, which enclosure permits the safe and secure holding of a cellular telephone therewithin, while protecting the cellular telephone if it were to be accidentally dropped or mishandled. The bulbous corners and one-eighth inch thick elastomeric rubber protecting the corners and side elements of the cellular telephone, ensure such protection thereby.

BRIEF DESCRIPTION OF THE DRAWINGS

The objects and advantages of the present invention will become more apparent, when viewed in conjunction with the following drawings in which:

FIG. 3 is a side elevational view of the protective enclosure and cellular telephone shown in FIG. 1;

FIG. 4 is a plan view of the cellular telephone and protective enclosure;

FIG. 5 is a view of the bottom of the protective enclosure and cellular telephone; and FIG. 6 is a view taken along line 6—6 of FIG. 3.

DESCRIPTION OF THE PREFERRED EMBODIMENTS

Figure 1:
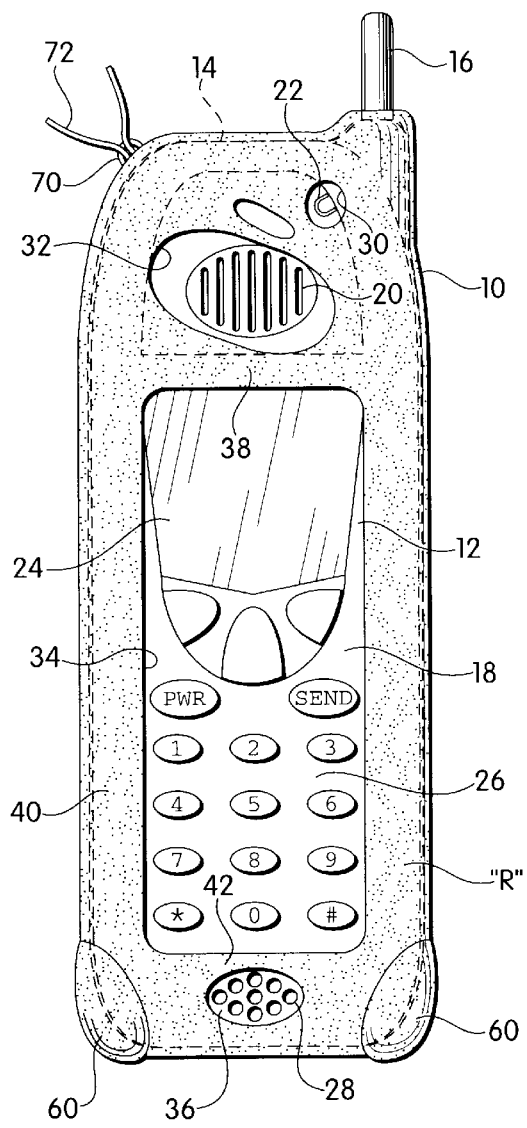
FIG. 1 is an elevational view of the front face of the protective enclosure and cellular telephone contained therewithin.
Figure 2:
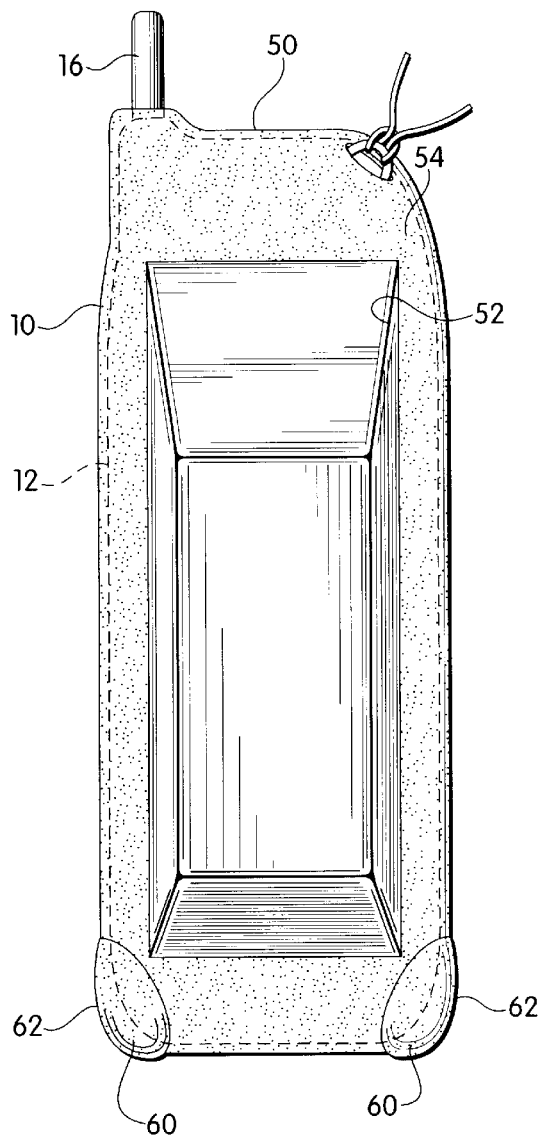
FIG. 2 is an elevational view of the rear side of the cellular telephone and protective enclosure shown in FIG. 1.

Referring now to the drawings in detail, and particularly to FIG. 1, there is shown the present invention which comprises a protective enclosure 10 for cellular telephones 12. The typical cellular telephone 12 is of rectilinear configuration, as embodied in the FIGS. 1–6, which telephone 12 is sized to readily fit in a person's hand or a pocket. The typical cellular telephone 12 has an upper end 14 with an antennae 16 extending upwardly from an upper surface thereof on one side, as shown in FIG. 1, a front facing panel 18 having a speaker 20 on an upper end thereof, a power button 22, a monitor panel 24 and a pressable keypad 26 for exposing alphanumeric keys, and a lower microphone 28 adjacent its lower-most edge.

The protective enclosure 10 in a preferred embodiment, comprises a web of elastomeric rubber "R", about ⅛ of an inch thick, molded to fit about the peripheral contours of the exemplified typical rectilinearly-shaped cellular telephone 12. The web elastomeric rubber "R" will stretch to accommodate size range of most typical present day cellular telephones 12. The protective enclosure 10 of the present invention comprises the elastomeric web of material covering all sides the cellular telephone 12, having an opening 30 for a power button 22 adjacent an uppermost edge of the cellular telephone 12, a generally oval shaped opening 32 on the upper front panel, to accommodate the speaker 20 on that cellular telephone 12, and an elongated rectangular opening 34 to permit viewing of the monitor 24 and access to the keypad 26 of that cellular telephone 12. A lowermost opening 36 for the microphone 28 is disposed immediately adjacent and beneath the rectangular opening 34 in the front panel of the protective enclosure 10. An elastomeric bridging strap 38 is disposed between the opening 32 for the speaker 20 and the rectangular opening 34 for the monitor 24 and keypad 26, so as to provide strength and maintenance of the enclosure panel 40 on the front side of the cellular telephone 12. A similar bridging strap 42 comprises the lower portion of the front panel, between the microphone opening 36 and the rectangular opening 34 for the keypad 26.

The protective enclosure 10 includes side panels 46 to cover the sides of the cellular telephone 12, as shown in FIG. 3. An elongated side opening 48 extends from a lower-most portion to an uppermost portion of each side panel 46, approximately three fourths of the length of that side panel 46, to improve stretch of the web "R" and holding of the phone 12. The protective enclosure 10 has an uppermost panel 50 covering the entire uppermost surface of the cellular telephone 12, except for the opening permitting the antennae 16 of that cellular telephone 12 to extend therethrough.

The protective enclosure 10 has a generally rectangular opening 52 on its rear side 54, to accommodate any enlarged portion 56 of the cellular telephone 12, for example a battery component thereon, or to permit access thereto. The protective enclosure 10 has four lowermost corners 60, which are provided with a bulbous corner pad 62 protruding thereon. Each bulbous corner pad 62 on the four lowermost corners 60 of the protective enclosure 10 comprise further safety arrangements for the cellular telephone 12 enclosed within the protective enclosure 10.

The protective enclosure 10 has a lowermost panel 66 with an elongated opening 68 thereacross, extending between the bulbous corners, as shown on FIG. 5. The lowermost opening 68 permits access to any power sockets which the typical cellular telephone 12 may utilize on its bottom end.

The web elastomeric rubber material "R", which is critical to applicant's invention, will typically yield to accommodate some variations in cellular telephone dimensions. The web elastomeric rubber material "R" comprising the various panels, also provides the surface texture and the structure necessary for ideal for securely holding such a cellular telephone.

The elongated side openings 48 and the elongated opening 68 in the lowermost panel of the protective enclosure 10 also permits improved holding power, and accommodation for the possible size variations between different cellular telephones.

In a further embodiment of the present invention, a support loop 70 is molded in the uppermost corner of the protective enclosure 10 on the side opposite the antennae opening, as shown in FIG. 1, which loop 70 permits a safety strap 72 to be threaded therethrough for further securement or loss prevention of the cellular telephone 12 therewithin.

Thus what has been shown is a unique protective enclosure 10 for a cellular telephone 12, which enclosure 10 permits the safe and secure holding of a cellular telephone therewithin, while protecting the cellular telephone if it were to be accidentally dropped or mishandled. The bulbous corners 62 and one-eighth inch thick elastomeric rubber "R" protecting the corners 60 and side elements of the cellular telephone, ensure such protection thereby.

It is apparent that changes and modifications can be made within the spirit and scope of the present invention, but it is my intention only to be limited by the scope of the appended claims.

As my invention, I claim:

1. A protective enclosure for a rectilinear shaped cellular telephone, said enclosure providing an inhibition to sliding of the phone on surfaces, a reduction in breakage of the phone from dropping and/or a reduction in accidental engagement of buttons on the phone through inadvertent touching of said buttons to other objects, said enclosure comprising:

a web portion formed of an elastomeric silicone rubber and snugly stretchable over said phone, said web portion covering at least portions of the front, sides, top and bottom portions of the phone;

an opening on the front of said web enclosure to provide for observation of indicia on the face of said phone and at least one additional opening on said enclosure web to enable access to said buttons on said phone whereby said phone can be dialed, said enclosure being sufficiently thick to extend beyond the protuberances forming the buttons of the phone thereby to reduce accidental engagement of said buttons; and an arrangement of bulbous corners disposed on the bottom of said enclosure to provide a base to enable the phone to stand upright.

2. The protective enclosure according to claim 1 wherein said elastomeric rubber portions are at least one sixteenth of an inch thick.

* * * * *